(12) United States Patent
Schröder

(10) Patent No.: US 6,302,006 B1
(45) Date of Patent: Oct. 16, 2001

(54) MACHINE SPINDLE

(76) Inventor: Reinhard Schröder, Sandbrink 8A, D-33729 Bielefeld (DE)

( * ) Notice: Subject to any disclaimer, the term of this patent is extended or adjusted under 35 U.S.C. 154(b) by 0 days.

(21) Appl. No.: 09/609,812

(22) Filed: Jul. 3, 2000

Related U.S. Application Data

(63) Continuation of application No. PCT/DE99/03433, filed on Oct. 28, 1999.

(30) Foreign Application Priority Data

Nov. 2, 1998 (DE) .............................................. 198 50 569

(51) Int. Cl.$^7$ ...................................................... B23B 19/02
(52) U.S. Cl. ................................ 82/147; 82/160; 82/165; 82/118
(58) Field of Search ............................. 82/147, 146, 145, 82/142, 160, 165, 118

(56) References Cited

U.S. PATENT DOCUMENTS

| | | | |
|---|---|---|---|
| 4,378,660 | * | 4/1983 | Wieber .................................. 51/56 G |
| 4,383,457 | * | 5/1983 | Corcoran ............................... 82/1.11 |
| 4,386,544 | * | 6/1983 | Fuminier ................................ 82/101 |
| 4,677,719 | * | 7/1987 | Link ......................................... 29/40 |
| 5,850,770 | * | 12/1998 | Rechage ................................ 82/142 |
| 6,038,948 | * | 3/2000 | Link et al. .............................. 82/147 |
| 6,079,303 | * | 6/2000 | Lyachovitsky ........................ 82/165 |

FOREIGN PATENT DOCUMENTS

| | | |
|---|---|---|
| 32 18 083 A1 | 11/1983 | (DE) . |
| 37 09 246 A1 | 10/1988 | (DE) . |
| 43 25 593 A1 | 2/1995 | (DE) . |
| 0 228 007 A2 | 7/1987 | (EP) . |
| 0 234 230 A2 | 9/1987 | (EP) . |

* cited by examiner

*Primary Examiner*—Henry Tsai
(74) *Attorney, Agent, or Firm*—Herbert L. Lerner; Laurence A. Greenberg; Werner H. Stemer

(57) ABSTRACT

A controlled spindle drive is utilized for producing an axially acting clamping force for the purpose of clamping/releasing tools or workpieces on the work spindle of machine tools. A two-part spindle shaft is enclosed coaxially by a ring which can be displaced axially between two end positions. In one end position, the ring connects the two spindle-shaft parts to form a spindle shaft, which acts as a whole, for a normal operation as a machine spindle. In the other end position, the spindle-shaft part with the tool or workpiece mounting, is connected in a fixed manner to the non-rotating spindle housing. The non-secured spindle-shaft part then acts exclusively on the task-specific clamping/release mechanism. The controlled spindle drive, which acts on the non-secured spindle-shaft part, can actuate the clamping mechanism exclusively. Instead of the axially displaceable, coaxially disposed ring, it is possible to use a second controlled spindle drive which drives the spindle-shaft part with the tool or workpiece mounting independently. The drive operations for the two drives are coupled via an axis interpolation.

19 Claims, 3 Drawing Sheets

MACHINE SPINDLE

CROSS-REFERENCE TO RELATED APPLICATION

This application is a continuation of copending International Application No. PCT/DE99/03433, filed Oct. 28, 1999, which designated the United States.

BACKGROUND OF THE INVENTION

Field of the Invention

The invention relates to a machine spindle for mounting tools or workpieces.

In conventional work spindles the clamping/release function is realized either manually or by hydraulically or pneumatically actuated clamping devices, the pressure medium having to be transmitted via rotary distributors from non-rotating components to the rotating parts. Due to leakage losses, heat development and the resulting limitation in terms of rotational speed and pressure which can be transmitted, rotary distributors constitute problematic machine components. For the purpose of tool clamping, cup-spring assemblies are thus often used within the rotating spindle. Such assemblies always have to be configured precisely with respect to a specific application case because short clamping paths and large release forces have to be taken into account and do not allow flexible solutions. For the purpose of securing the machine spindle in a certain angle position, a further hydraulically or pneumatically actuated device is required on the work spindles.

Published German Patent Application No. DE 43 25 593 A1 describes a machine spindle which, due to specifically configured elements, can execute clamping/release functions by way of the spindle drive itself. However, the functioning principle results in a disadvantageous rotation of the clamping mount during the clamping/release operation.

SUMMARY OF THE INVENTION

It is accordingly an object of the invention to provide a machine spindle which overcomes the above-mentioned disadvantages of the heretofore-known machine spindles of this general type and which is suited as a work spindle of machine tools and robots in which functions such as rotation, positioning and securing in a certain angle position, clamping and releasing as well as the gripping of tools or workpieces are combined in as compact a unit as possible with the smallest possible number of functional elements.

With the foregoing and other objects in view there is provided, in accordance with the invention, a machine spindle for mounting a tool or a workpiece, including:

a rotationally-fixed spindle housing;

a two-part, central spindle shaft having a first spindle-shaft part and a second spindle-shaft part;

the first and second spindle-shaft parts being rotatable with respect to one another, being axially non-displaceable with respect to one another, and being disposed coaxially with respect to one another;

the first spindle-shaft part having a mounting device for mounting one of a tool and a workpiece;

the two-part, central spindle shaft having spindle ends, respectively formed by the first and second spindle-shaft parts, the two-part, central spindle shaft being mounted as a unit, at the spindle ends, in the rotationally-fixed spindle housing;

an integrated, task-dependent clamping/release mechanism operatively associated with the first and second spindle-shaft parts, the integrated, task-dependent clamping/release mechanism being actuatable by rotating the first spindle-shaft part relative to the second spindle-shaft part; and an angle-position-controlled spindle drive connected to the second spindle-shaft part.

In accordance with another feature of the invention, a further angle-position controlled spindle drive is connected to the first spindle-shaft part. A position sensor is disposed in the spindle housing, the position sensor permanently sensing respective angle-of-rotation positions of the first and second spindle-shaft parts. A process computer is connected to the position sensor, the process computer monitoring whether a predetermined clamping/release status is maintained, and, when a high clamping/release moment is introduced, the angle-position controlled spindle drive on the second spindle-shaft part assisting the further angle-position controlled spindle drive on the first spindle-shaft part, as a parallel drive, with a sufficient distance from the clamping/release moment.

In accordance with a further feature of the invention, the integrated, task-dependent clamping/release mechanism is a self-locking or self-inhibiting clamping/release mechanism.

In other words, the machine spindle for tool or workpiece mounting according to the invention, has a two-part, central spindle shaft which, by way of its two spindle-shaft parts, which can be rotated in relation to one another but cannot be displaced axially in relation to one another, is mounted as a unit at both spindle ends in a rotationally fixed spindle housing. The two spindle-shaft parts of the spindle shaft are provided coaxially, and the spindle shaft is mounted in a stable manner as a unit. An integrated, task-dependent clamping/release mechanism can be actuated by rotation of the first spindle-shaft part relative to the second spindle-shaft part. The machine spindle is assigned at least one angle-position-controlled spindle drive, and the second spindle-shaft part, without a tool or workpiece mounting, is connected to the spindle drive.

During clamping and release via the spindle drive, the necessary supporting function or counteracting function takes effect, depending on the respective configuration, either as indexing or clamping of the spindle, or it acts in the form of a second controlled drive in that a clamping/release operation is possible at any desired rotational speed for the tool or workpiece mounting (including rotational speed 0). For this purpose, the central spindle shaft is provided in two parts, with the result that, by rotation of the two spindle-shaft parts relative to one another, a clamping/release mechanism, which differs from case to case, is actuated.

The spindle-shaft unit is mounted in a stable manner as a whole either in that the first spindle-shaft part, which has a tool or workpiece mounting, is mounted in two bearing locations in an ordered manner in the rotationally fixed spindle housing and the second spindle-shaft part, for its part, is mounted indirectly and coaxially on or in the first spindle-shaft part or in that the first spindle-shaft part, with the tool or workpiece mounting, is mounted directly in the spindle housing, in a first bearing location, only on the side with the tool or workpiece mounting and has the other part-shaft end mounted indirectly in the second spindle-shaft part, wherein the latter, for its part, is mounted directly in the spindle housing only by way of the second bearing location and, in the process, is supported by the first, stably mounted spindle-shaft part in that the latter extends, within the second spindle-shaft part, into the second bearing location or else into a very close proximity thereof.

According to a preferred embodiment of the invention, the two-part spindle shaft is enclosed coaxially by a ring which can be displaced axially between two end positions and, in one axial end position, connects the two spindle-shaft parts to form a spindle shaft, which acts as a unit, for the normal operation as machine spindle and, in its other axial end position, connects the first spindle-shaft part, with the tool or workpiece mounting, in a fixed manner to the non-rotating spindle housing, the second, non-secured spindle-shaft part being coupled exclusively to the clamping/release mechanism which is used in accordance with a respective given task and can actuate the clamping mechanism specifically via a controlled spindle drive connected to the spindle-shaft part.

In a further advantageous embodiment of the invention, the first spindle-shaft part, with the tool or workpiece mounting, is connected by the two-part spindle shaft to a dedicated angle-position-controlled spindle drive, by which the first spindle-shaft part can be driven separately, the separate activations for the two spindle-shaft parts being coupled via axis interpolation.

The two spindle-shaft parts are provided within the spindle-shaft unit in an axially stationary manner such that they can be rotated in relation to one another, with the result that reaction forces can be absorbed by the axial connection during the clamping/release operation.

The clamping/release movement can advantageously be transmitted or transferred at the spindle-shaft end to an actuating element for the clamping/release mechanism, the actuating element being guided through the entire spindle shaft, by connecting the actuating element to the cup-like spindle-shaft part or by configuring the actuating element integrally with the spindle-shaft part. Alternatively, according to another preferred embodiment, the clamping/release movement is transmitted to an actuating element, which is guided in the spindle-shaft interior, via a spindle penetration in the first spindle-shaft part, in that either part of the second spindle-shaft part itself acts, and is configured, as a clamping nut or, a separate clamping nut, which is likewise disposed on the first spindle-shaft part in a coaxial and axially non-displaceable manner, picks up or absorbs the relative rotation of the second spindle-shaft part. The second spindle-shaft part, which is configured as a clamping nut, or the separate clamping nut is connected to axially displaceable segments in longitudinal grooves on the spindle-shaft part such that its relative rotation results in an axial movement of the clamping segments and of the actuating element coupled thereto.

The entire clamping/release path is divided up functionally into a first section, in which specific clamping elements such as clamping inserts and grippers can be released or fixed as a whole, and into a remaining section, in which the specific clamping elements are actuated.

In one of its axial end positions, the coaxially disposed and axially displaceable ring connects the two spindle-shaft parts in a form-fitting manner, which secures the rotary position thereof in relation to one another and the resulting clamping/release status. The ring has an inner toothing configuration which, in one axial end position, is in engagement with a mating outer toothing configuration on the two spindle-shaft parts at the same time and, in the other axial end position, is in engagement only with an outer toothing configuration of one spindle-shaft part.

The coaxially disposed ring is radially coaxially divided in two, the outer ring part being configured such that it can be displaced axially but cannot be rotated in relation to the spindle housing, and the inner ring part being connected to the outer ring part such that it can be rotated but cannot be displaced axially. The outer, non-rotatable ring part is preferably configured as an annular piston and, along with the spindle housing, forms a pressure chamber which can be pressurized with a pressure medium. In one axial end position, the outer ring part produces the play-free connection between the non-rotating spindle housing and the spindle-shaft part with the tool or workpiece mounting. Provided in the spindle housing is a position sensor which senses the respective angle-of-rotation positions of the two spindle-shaft parts. Furthermore, the position sensor can monitor as to whether a certain clamping/release status is maintained, with the result that, with high clamping/release moments introduced, the spindle drive on the second spindle-shaft part can assist the spindle drive on the first spindle-shaft part, as a parallel drive, with a sufficient distance from the clamping/release moment.

Since the clamping/release mechanism is a self-locking configuration, there is no need for a constant active support of the spindle drive on the spindle-shaft part for the purpose of maintaining the clamping force.

Other features which are considered as characteristic for the invention are set forth in the appended claims.

Although the invention is illustrated and described herein as embodied in a machine spindle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
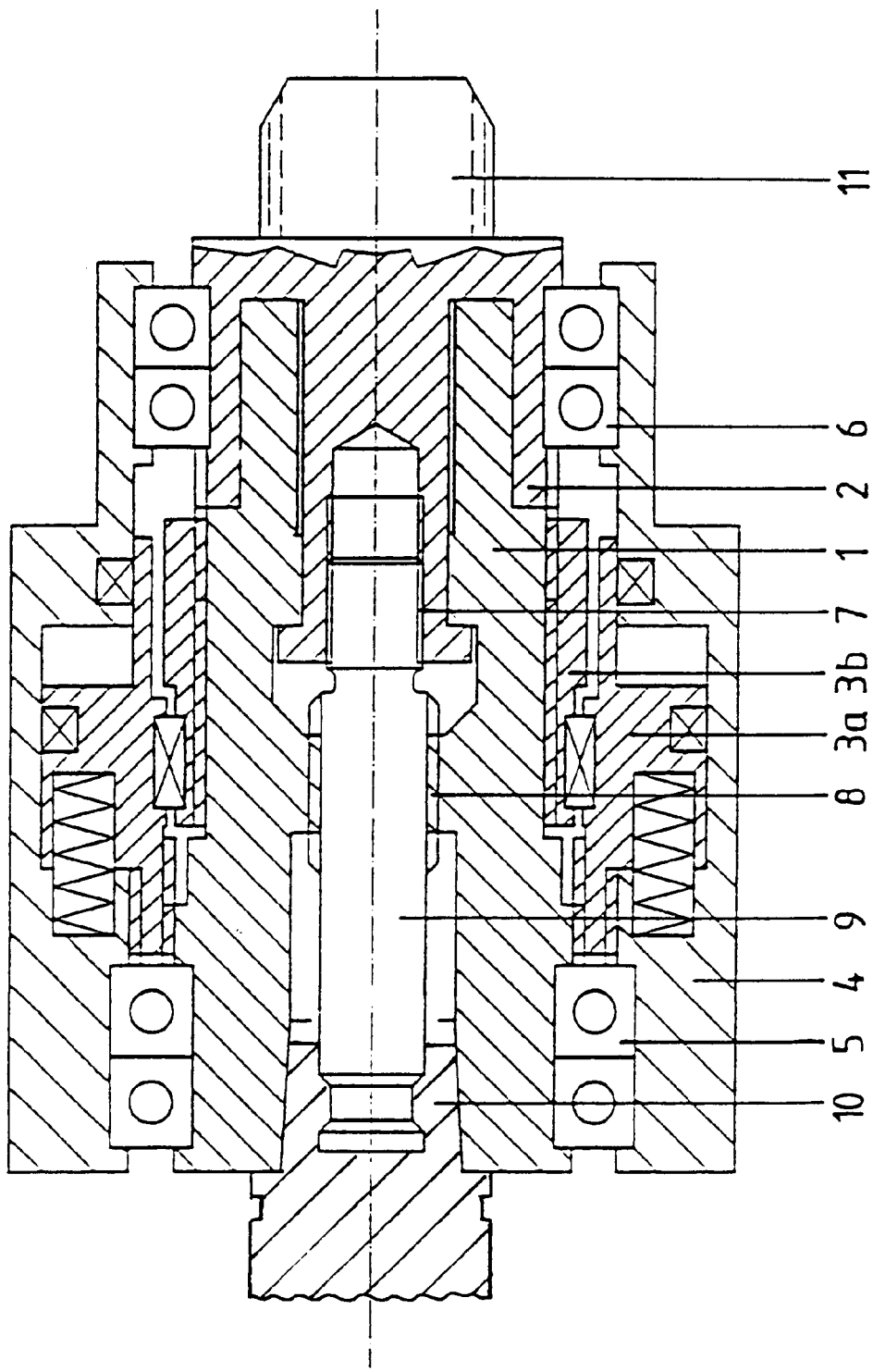
FIG. 1 is a sectional view of a work spindle for use as a fixed and as a rotating tool mounting with the clamping-force being introduced via a spindle end.

Referring now to the figures of the drawings in detail and first, particularly, to FIG. 1 thereof, there is shown a work spindle of which the central, two-part spindle shaft, made of two spindle-shaft parts 1, 2, is enclosed coaxially by a ring 3a, 3b which can be displaced axially between two end positions. In this case, in one of its axial end positions, the ring 3a, 3b connects the two spindle-shaft parts 1, 2 to form a spindle shaft, which acts as a unit, for utilization of the device as a tool spindle. In its other axial end position, the coaxial ring 3 connects the spindle-shaft part 1, with the tool mounting, in a fixed manner to the non-rotating spindle housing 4, wherein it is possible, in this position, for tools to be clamped or released by the controlled spindle drive 11 or for the entire unit to be utilized as a fixed tool mounting. In this case, the clamping movement is transmitted at the spindle end to a two-part actuating element 9, which is guided through the entire spindle shaft and, within the spindle shaft, converts the rotary clamping/release movement into an axial movement. The clamping/release mechanism is dependent on the tool system used. FIG. 1 further shows an integrated, task dependent clamping/release mechanism 10 which is connected to a spindle-shaft part 2. Bearing locations 5, 6 are provided in the spindle housing 4 for supporting the spindle-shaft parts 1, 2. The spindle-shaft 2 is configured as a clamping nut 7 such that a relative rotation of the spindle-shaft part 2 results in an axial movement of the clamping segments 8 and of the actuating element 9 coupled thereto.

Figure 2:
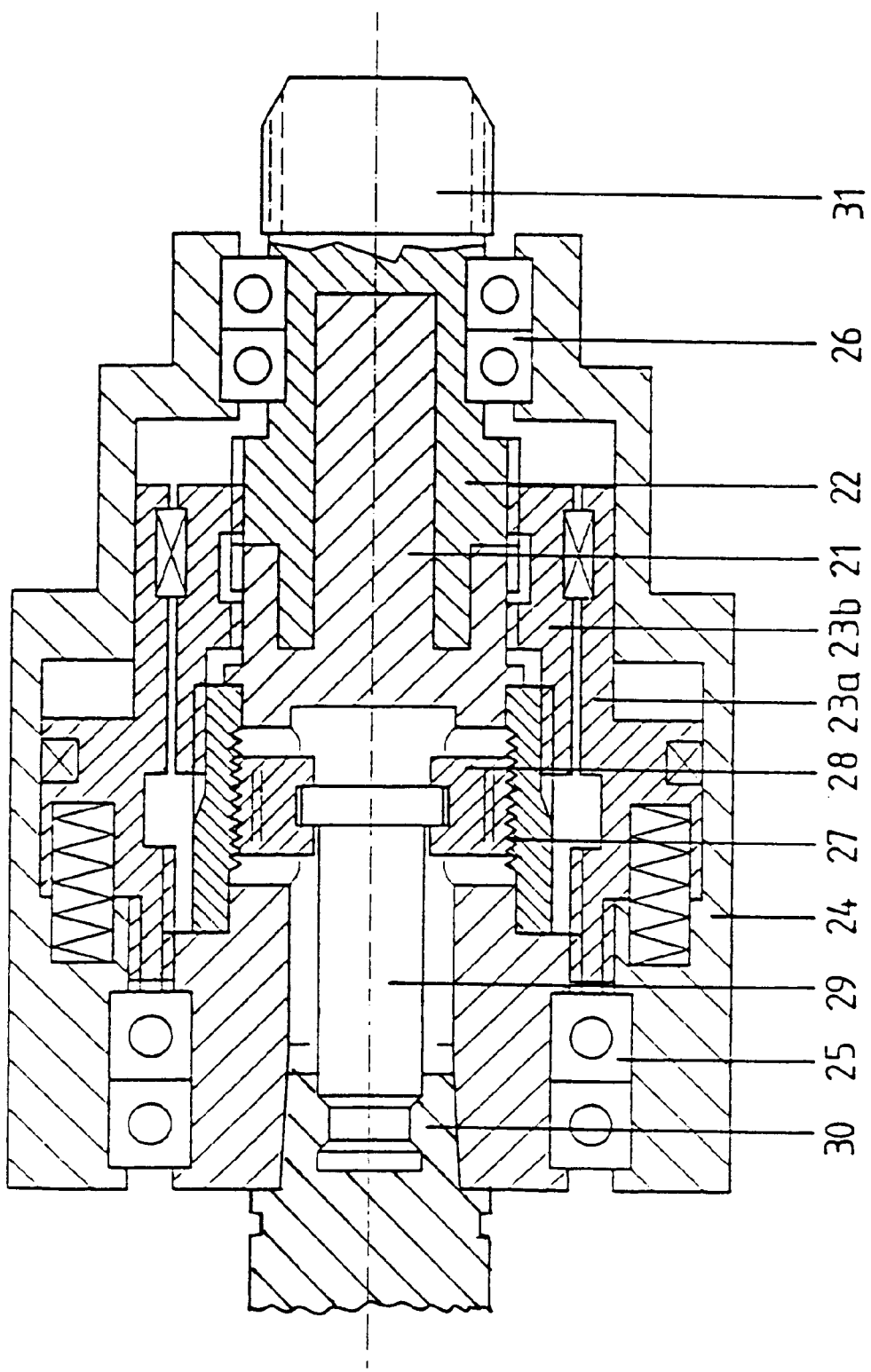
FIG. 2 is a sectional view of a work spindle for use as a fixed and as a rotating tool mounting with the clamping-force being introduced via a spindle penetration.

FIG. 2 illustrates a variant of the work spindle according to FIG. 1. In this case, the clamping/release movement is guided to the tool mounting via spindle penetration in the spindle-shaft part 21. The relative rotation of the spindle-shaft part 22 is transmitted to a coaxially disposed, axially non-displaceable clamping nut 27 on the spindle-shaft part 21, the clamping nut, for its part, being connected to axially displaceable segments 28 in longitudinal grooves on the spindle-shaft part 21 such that its relative rotation results in an axial movement of the clamping segments 28 and of the actuating element 29 coupled thereto. FIG. 2 further shows a clamping/release mechanism 30 connected to the spindle-shaft part 22. Bearing locations 25, 26 are provided in the spindle housing 24 for supporting the spindle-shaft parts 1, 2.

Figure 3:
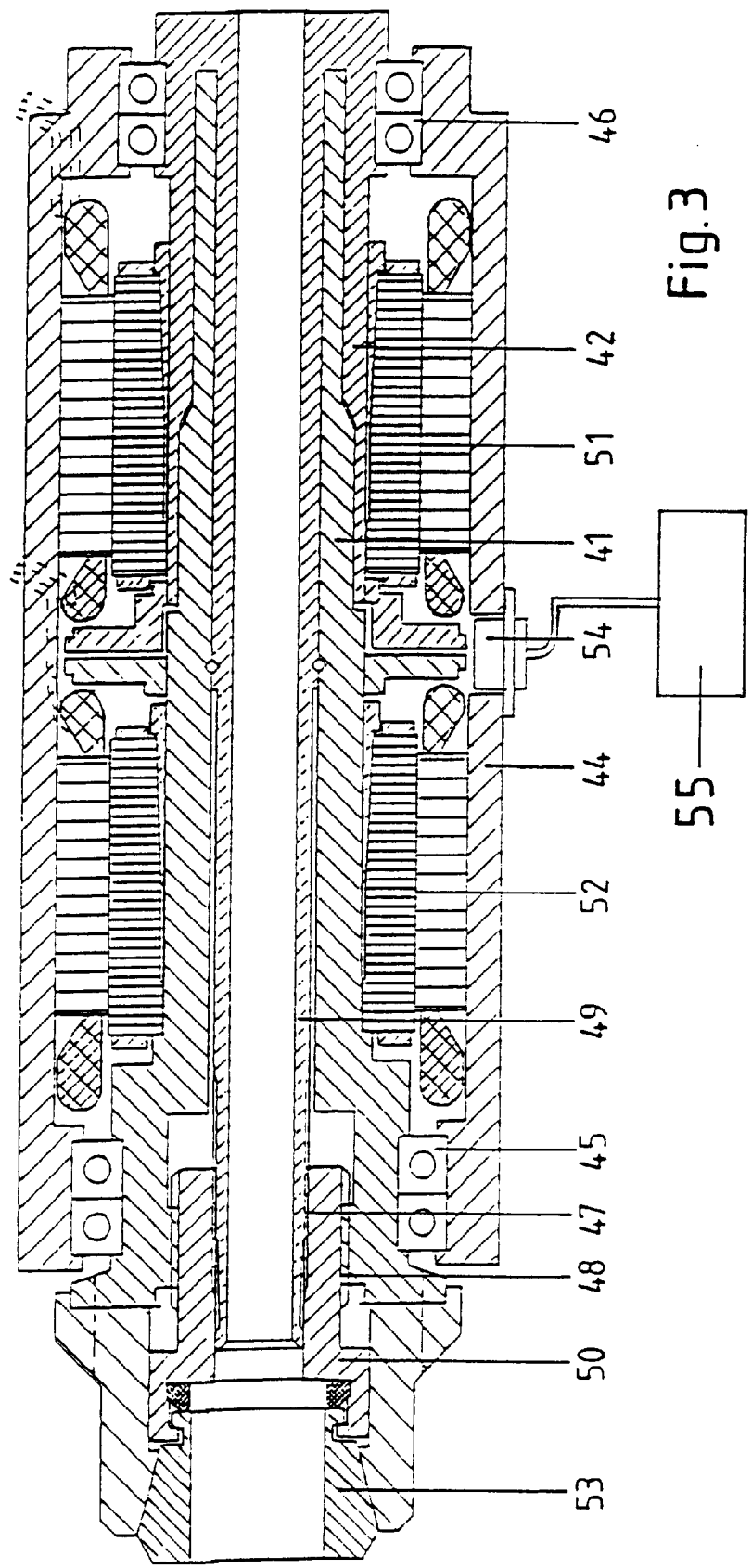
FIG. 3 is a sectional view of a work spindle as a motor spindle with a workpiece-clamping device.

FIG. 3 shows a work spindle with a workpiece-clamping device which is configured as a double motor spindle. The two spindle-shaft parts 41, 42 are connected to dedicated spindle drives 51, 52. A position sensor 54 permanently senses the respective angle-of-rotation positions of the two spindle-shaft parts 51, 52, which, via suitable activation or control with axis interpolation, allows specific clamping/release operations at any desired rotational speed for the workpiece mounting in that the spindle-shaft part 52 is operated with a controlled rotation differing from the rotation of the spindle-shaft part 51. Apart from clamping/release operations, the position sensor 54 also monitors as to whether a certain, desired clamping/release status is maintained. A process computer 55 is connected to the position sensor 54 for monitoring and controlling a clamping/release status. In this case, the clamping/release movement is transferred at the spindle end, as a rotary movement, to an actuating element 49 which is configured as a tube and is guided through the entire spindle shaft 51, 52. The rotary movement is converted into an axial movement via a threaded connection to the non-rotatable but axially displaceable clamping/release mechanism 50. Since the clamping/release movement functions as a controlled axis, this controlled axis can be effective in a functionally divided manner in that, for example, the clamping/release mechanism 50, in its furthest-forward position, releases the entire clamping set 53 for exchange purposes and, in the rest of the region of the same movement, the clamping set 53 is actuated for workpiece clamping. FIG. 3 further illustrates bearing locations 45, 46 which are provided in the spindle housing 44 for supporting the spindle-shaft parts 41, 42. The spindle-shaft part 42 is configured as a clamping nut 47 such that a relative rotation of the spindle-shaft part 42 results in an axial movement of the clamping segments 48. The tubular actuating element 49 allows the work spindle to be used for processing bar stock.

I claim:

1. A machine spindle for mounting one of a tool and a workpiece, comprising:

a rotationally-fixed spindle housing;

a two-part, central spindle shaft having a first spindle-shaft part and a second spindle-shaft part;

said first and second spindle-shaft parts being rotatable with respect to one another, being axially non-displaceable with respect to one another, and being disposed coaxially with respect to one another;

said first spindle-shaft part having a mounting device for mounting one of a tool and a workpiece;

said two-part, central spindle shaft having spindle ends, respectively formed by said first and second spindle-shaft parts, said two-part, central spindle shaft being mounted as a unit, at said spindle ends, in said rotationally-fixed spindle housing;

an integrated, task-dependent clamping mechanism operatively associated with said first and second spindle-shaft parts, said integrated, task-dependent clamping mechanism being actuatable by rotating said first spindle-shaft part relative to said second spindle-shaft part;

an angle-position-controlled spindle drive connected to said second spindle-shaft part;

a ring coaxially enclosing said two-part, central spindle shaft;

said ring being axially displaceable between two axial end positions and, in one of the axial end positions, said ring connecting said first and second spindle-shaft parts such that said two-part, central spindle shaft acts as said unit for a normal operation as a machine spindle and, in another one of the end positions, said ring connecting said first spindle-shaft part fixedly to said rotationally-fixed spindle housing, and said second spindle-shaft part being coupled exclusively to said integrated, task-dependent clamping mechanism; and said integrated, task-dependent clamping mechanism being actuatable for a clamping operation, via said angle-position-controlled spindle drive connected to said second spindle-shaft part.

2. The machine spindle according to claim 1, including two bearing locations disposed in said rotationally-fixed spindle housing, said first spindle-shaft part being mounted in said two bearing location s in said rotationally-fixed spindle housing, said second spindle-shaft part being disposed coaxially and mounted indirectly to said first spindle-shaft part for mounting said two-part, central spindle shaft in a stable manner as a whole.

3. The machine spindle according to claim 1, wherein:

said first spindle-shaft part has a first side and a second side opposite said first side, said mounting device is disposed on said first side of said first spindle-shaft part;

a first bearing location and a second bearing location are disposed in said rotationally-fixed spindle housing;

said first spindle-shaft part is mounted directly, at said first side, in said rotationally-fixed spindle housing at said first bearing location, and said first spindle-shaft part extends at said second side into said second spindle-shaft part to a region near said second bearing location and is mounted, at said second side, indirectly in said second spindle-shaft part for supporting said second spindle-shaft part; and said second spindle-shaft part is mounted directly in said rotationally-fixed spindle housing only at said second bearing location.

4. The machine spindle according to claim 1, wherein said first and second spindle-shaft parts are disposed in an axially stationary manner such that said first and second spindle-shaft parts form an axial connection, said first and second spindle-shaft parts are rotatable with respect to one another and the axial connection absorbs reaction forces during a clamping operation.

5. The machine spindle according to claim 1, including an actuating element assigned to said integrated, task-dependent clamping mechanism, said actuating element being guided entirely through said two-part, central spindle shaft for transmitting a clamping movement at an end of said two-part, central spindle shaft to said actuating element, said actuating element being connected to said second spindle-shaft part, and said second spindle-shaft part being a cuplike spindle-shaft part.

6. The machine spindle according to claim 1, including an actuating element assigned to said integrated, task-dependent clamping mechanism, said actuating element being guided entirely through said two-part, central spindle shaft for transmitting a clamping movement at an end of said two-part, central spindle shaft to said actuating element, and said second spindle-shaft part being integrally formed with said actuating element.

7. The machine spindle according to claim 1, including:
an actuating element and clamping segments coupled to said actuating element;
said two-part, central spindle shaft having an interior region, said actuating element being guided through said interior region of said two-part, central spindle-shaft for transmitting a clamping movement through said first spindle-shaft part to said actuating element; and
said second spindle-shaft part being configured as and acting as a clamping nut such that a relative rotation of said second spindle-shaft part results in an axial movement of said clamping segments and of said actuating element coupled thereto.

8. The machine spindle according to claim 1, including:
an actuating element and clamping segments coupled to said actuating element, said first spindle-shaft part being formed with longitudinal grooves, said clamping segments being axially displaceable and guided in said longitudinal grooves formed in said first spindle-shaft part;
said two-part, central spindle shaft having an interior region, said actuating element being guided through said interior region of said two-part, central spindle-shaft for transmitting a clamping movement through said first spindle-shaft part to said actuating element; and
a clamping nut provided in a coaxial and axially non-displaceable manner on said first spindle-shaft part, said clamping nut being connected to said axially displaceable clamping segments such that a relative rotation of said second spindle-shaft part results in an axial movement of said clamping segments and of said actuating element coupled thereto.

9. The machine spindle according to claim 1, including:
actuating element and clamping segments coupled to said actuating element;
clamping elements assigned to said clamping segments;
said two-part, central spindle shaft having an interior region, said actuating element extending through said interior region of said two-part, central spindle-shaft for transmitting a clamping movement to said actuating element, the clamping movement defining a corresponding clamping path, the clamping path being functionally divided into a first section and a second section, said clamping elements being one of releasable and fixable as a whole in the first section, and said clamping elements being actuatable in the second section.

10. The machine spindle according to claim 9, wherein said clamping elements are one of clamping inserts and grippers.

11. The machine spindle according to claim 1, including a ring coaxially enclosing said two-part, central spindle shaft, said ring being axially displaceable between two axial end positions and, in one of the axial end positions, said ring connecting said first and second spindle-shaft parts in a form-fitting manner for securing a rotary position thereof in relation to one another and for securing a resulting clamping status.

12. The machine spindle according to claim 11, wherein:
said coaxially disposed and axially displaceable ring has an inner toothing configuration;
said first and second spindle-shaft parts have respective mating outer tooting configurations;
said inner toothing configuration, when said ring is in one of the axial end positions, is simultaneously in engagement with both of said mating outer toothing configurations on said first and second spindle-shaft parts; and
said inner toothing configuration, when said ring is in another one of the axial end positions, is in engagement with only one of said mating outer toothing configurations, said only one of said mating outer toothing configurations is provided on said first spindle-shaft part.

13. The machine spindle according to claim 1, including:
a ring coaxially enclosing said two-part, central spindle shaft;
said ring being axially displaceable between two axial end positions and, in one of the axial end positions, said ring connecting said first and second spindle-shaft parts such that said two-part, central spindle shaft acts as said unit for a normal operation as a machine spindle and, in another one of the axial end positions, said ring connecting said first spindle-shaft part in a fixed manner to said rotationally-fixed spindle housing;
said ring being radially coaxially divided in an outer ring part and an inner ring part, said outer ring part being axially displaceable and being rotationally fixed with respect to said spindle housing, said inner ring part being rotatably and axially non-displaceably connected to said outer ring part.

14. The machine spindle according to claim 13, wherein said outer ring part is an annular piston and, together with said spindle housing, forms a pressure chamber to be pressurized with a pressure medium.

15. The machine spindle according to claim 13, wherein said outer ring part, when in one of the axial end positions, forms a play-free connection between said rotationally fixed spindle housing and said first spindle-shaft part.

16. The machine spindle according to claim 1, including at least one position sensor disposed in said spindle housing, said at least one position sensor sensing respective angle-of-rotation positions of said first and second spindle-shaft parts.

17. The machine spindle according to claim 1, including:
a further angle-position controlled spindle drive connected to said first spindle-shaft part;
a position sensor disposed in said spindle housing, said position sensor permanently sensing respective angle-of-rotation positions of said first and second spindle-shaft parts; and
a process computer connected to said position sensor, said process computer monitoring whether a predetermined clamping status is maintained, and, when a high clamping moment is introduced, said angle-position controlled spindle drive on said second spindle-shaft part assisting said further angle-position controlled spindle drive on said first spindle-shaft part, as a parallel drive, with a sufficient distance from the clamping moment.

18. The machine spindle according to claim 1, wherein said integrated, task-dependent clamping mechanism is a self-locking clamping mechanism.

19. A machine spindle for mounting one of a tool and a workpiece, comprising:

a rotationally-fixed spindle housing;

a two-part, central spindle shaft having a first spindle-shaft part and a second spindle-shaft part;

said first and second spindle-shaft parts being rotatable with respect to one another, being axially non-displaceable with respect to one another, and being disposed coaxially with respect to one another;

said first spindle-shaft part having a mounting device for mounting one of a tool and a workpiece;

said two-part, central spindle shaft having spindle ends, respectively formed by said first and second spindle-shaft parts, said two-part, central spindle shaft being mounted as a unit, at said spindle ends, in said rotationally-fixed spindle housing;

an integrated, task-dependent clamping mechanism operatively associated with said first and second spindle-shaft parts, said integrated, task-dependent clamping mechanism being actuatable by rotating said first spindle-shaft part relative to said second spindle-shaft part;

an angle-position-controlled spindle drive connected to said second spindle-shaft part; and said first spindle-shaft part having a dedicated angle-position-controlled spindle drive connected thereto, said dedicated angle-position-controlled spindle drive providing a control for said first spindle-shaft part separate from a control for said second spindle-shaft part, the control for said first spindle-shaft part and the control for said second spindle-shaft part coupled via an axis interpolation.

\* \* \* \* \*